2,979,923

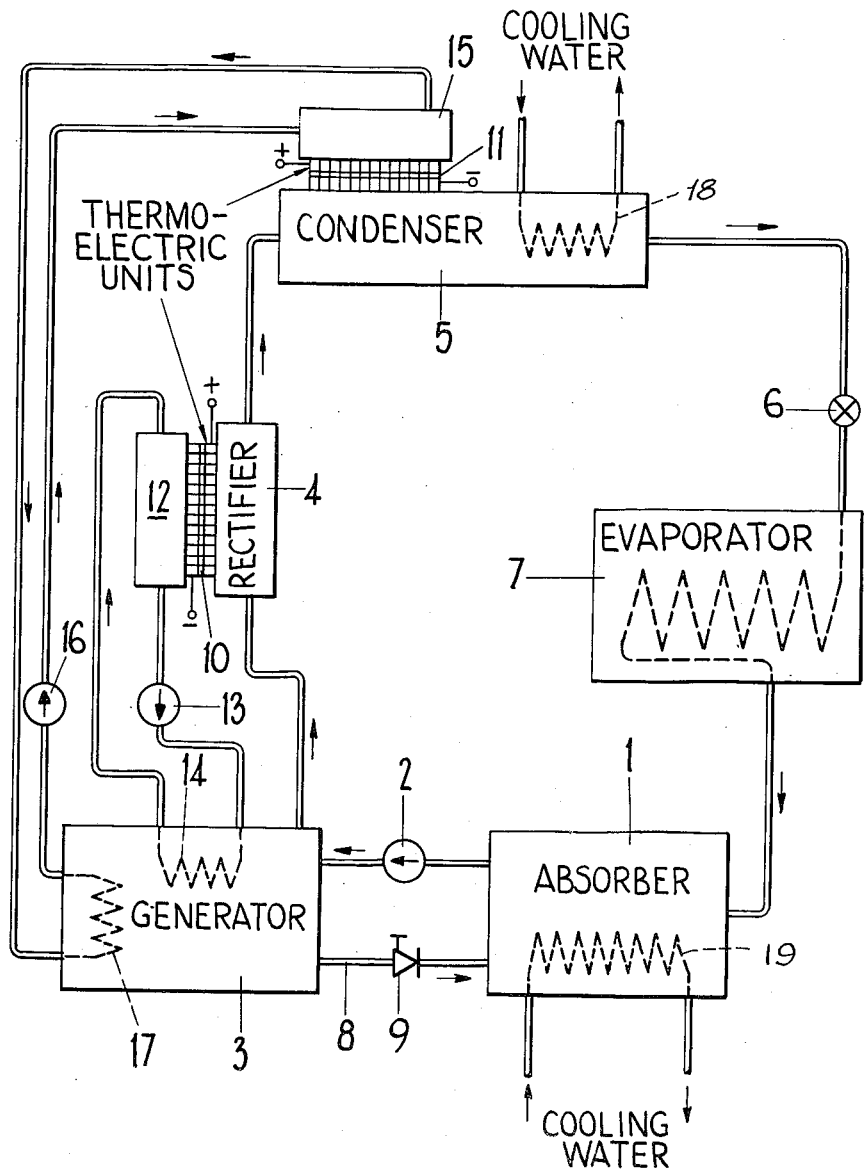

REFRIGERATING SYSTEMS

Harry Bury, Ickenham, England, assignor to The General Electric Company Limited, Kingsway, London, England Filed Nov. 23, 1959, Ser. No. 854,800

Claims priority, application Great Britain Nov. 25, 1958

4 Claims. (Cl. 62—476)

This invention relates to refrigerating systems of the absorption type.

During the operation of a refrigerating system of the absorption type, heat must be supplied continuously to the generator of the system while parts of the system to which heat is rejected by the refrigerant, namely the absorber, the condenser, and the rectifier, must be continuously cooled. The present invention has for its object to utilise the heat rejected from one or more of these parts for heating the generator, whereby to increase the efficiency of the system.

According to the present invention, in a refrigerating system of the absorption type including a generator, means for supplying heat to the generator include a thermocouple assembly in which the hot junctions are in heat exchange relationship with the generator and the cold junctions are in heat exchange relationship with a part of the system to which heat is rejected.

Thus the cold junctions may be in heat exchange relationship with the condenser of the system, or the absorber. A second thermocouple assembly may be provided, in which the hot junctions are in heat exchange relationship with the generator and the cold junctions are in heat exchange relationship with a further part of the system, which may be a rectifier.

Preferably, a circulating heat transfer fluid is used to convey heat from the said part of the system to the cold junctions.

In order that the invention may be clearly understood, one refrigerating system in accordance with the invention will now be described, by way of example, with reference to the accompanying drawing, which is a schematic diagram illustrating the layout of the system.

Referring to the drawing, the system comprises essentially an absorber 1, in which ammonia gas is absorbed in water, a pump 2 for feeding ammonia solution from the absorber to a generator 3, means for supplying heat to the generator so as to separate the dissolved ammonia gas from the water, a rectifier 4 in which water vapour is condensed and returned to the generator, a condenser 5 in which the separated ammonia is liquified, an expansion valve 6, and an evaporator 7 in which expansion of the ammonia effects cooling. These parts of the system are arranged in a closed circuit, expanded gas being passed back to the absorber from the evaporator. A water return path 8 including a valve 9 is provided between the generator 3 and the absorber 1.

While the refrigerating system is in operation, heat must be supplied to the generator continuously. This is done by means of two thermoelectric units 10 and 11, each comprising an assembly of thermocouples connected to provide hot junctions and cold junctions. The dissimilar elements of the thermocouples are p-type and n-type elements of bismuth telluride, or of semi-conducting material having a crystal structure similar to that of bismuth telluride.

The hot junctions of each thermocouple assembly are in heat exchange relationship with the generator 3; and the cold junctions are in heat exchange relationship with a part of the system to which heat is rejected. Thus the cold junctions of the assembly constituting the unit 10 are in close thermal contact with the wall of the rectifier 4, the hot junctions being in thermal contact with a chamber 12 through which a heat transfer liquid is circulated by a pump 13, the liquid passing through a heat exchanger 14 in the generator 3. Similarly, the cold junctions of the assembly constituting the unit 11 are in thermal contact with the wall of the condenser 5, and the hot junctions are in thermal contact with a chamber 15 through which heat transfer liquid is circulated by a pump 16, this liquid passing through a second heat exchanger 17 in the generator 3.

Although this is not shown in the present system, it would be possible to utilise the heat rejected at the absorber for heating the generator, in the same manner.

Because the generator is heated by those parts of the system to which the heat is rejected, the said parts are necessarily cooled by the thermoelectric units; such cooling is preferably assisted, however, by passing cooling water through heat exchangers 18 and 19 in the condenser 5 and absorber 1, conventional cooling of the latter being necessary in any case.

Considering now the thermodynamic characteristics of the system described, suitable working temperature in the various parts of the system and the quantities of heat per gram of ammonia, rejected or absorbed, are as follows:

Generator, 93° C. ------------ 500 calories absorbed
Rectifier, 55° C. ------------ 55 calories rejected
Condenser, 32° C. ------------ 292 calories rejected
Evaporator, −12° C. --------- 333 calories absorbed
Absorber, 27° C. ------------ 472 calories rejected Thus if a temperature drop of 17° C. is allowed for heat exchange, the thermoelectric unit 10 would operate with an overall temperature difference of 55.5° C. between the hot and cold junctions. If the semiconductor material of which the thermocouples are formed has a figure of merit of $3.0 \times 10^{-3}$ ° K.$^{-1}$, therefore, the performance energy ratio of the unit will be 1.6 and the heat output of the unit (per gram of ammonia) 148 calories with an electrical input of 93 calories.

A further 352 calories have to be obtained from the condenser therefore, and it can be shown in the same manner that this quantity of heat is obtained if the performance energy ratio of the unit 11 is 1.28 and the electrical input to the unit 272 calories, allowing a temperature drop in heat exchange of 17° C.

From these considerations it can be shown that the overall coefficient of performance of the system is 333 calories/(93 calories+272 calories)=0.91. Unassisted by the thermoelectric units, the system would have an overal coefficient of performance of 333 calories/500 calories=0.67.

I claim:

1. In combination with a refrigerating system of the absorption type including a generator in which heat is imparted to a working refrigerant, a thermocouple assembly connected to provide hot junctions and cold junctions, and means for supplying electric current to the thermocouples of said assembly, said hot junctions being in heat exchange relation with said generator and said cold junctions being in heat exchange relation with a part of said system to which heat is rejected by the refrigerant.

2. The combination set forth in claim 1, including means for circulating a heat transfer fluid in a closed path between said generator and said hot junctions.

3. In combination with a refrigerating system of the absorption type including a generator in which heat is imparted to a working refrigerant and a condenser in which heat is rejected by said refrigerant, a thermocouple assembly connected to provide hot junctions and cold junctions, and means for supplying electric current to the thermocouples of said assembly, said hot junctions being in heat exchange relation with said generator and said cold junctions being in heat exchange relation with said condenser.

4. In combination with a refrigerating system of the absorption type including a generator, in which heat is imparted to a working refrigerant, and a condenser and a rectifier in which heat is rejected by said refrigerant, a first thermocouple assembly and a second thermocouple assembly, the thermocouples of each said assembly being connected to provide hot junctions and cold junctions, and means for supplying electric current to the thermocouples of said assemblies, the hot junctions of both said assemblies being in heat exchange relation with said generator, and the cold junctions of said assemblies being in heat exchange relation with said condenser and said rectifier respectively.

References Cited in the file of this patent

UNITED STATES PATENTS

| | | |
|---|---|---|
| 2,278,998 | Kogel | Apr. 7, 1942 |
| 2,737,031 | Wulle | Mar. 6, 1956 |